(12) United States Patent
Jones et al.

(10) Patent No.: US 9,007,332 B2
(45) Date of Patent: Apr. 14, 2015

(54) POSITION SENSING PANEL (75) Inventors: Gareth Michael Jones, Hampshire (GB); Esat Yilmaz, Santa Cruz, CA (US)

(73) Assignee: Atmel Corporation, San Jose, CA (US)

( * ) Notice: Subject to any disclaimer, the term of this patent is extended or adjusted under 35 U.S.C. 154(b) by 1058 days.

(21) Appl. No.: 13/069,084

(22) Filed: Mar. 22, 2011

(65) Prior Publication Data

US 2012/0242585 A1    Sep. 27, 2012

(51) Int. Cl.
*G06F 3/045* (2006.01)
*G06F 3/041* (2006.01)
*G06F 3/044* (2006.01)

(52) U.S. Cl.
CPC ...... *G06F 3/044* (2013.01); *G06F 2203/04107* (2013.01); *G06F 2203/04103* (2013.01); *G06F 2203/04113* (2013.01)

(58) Field of Classification Search
CPC ............ G06F 2203/04113; G06F 2203/04111; G06F 2203/04103; G06F 2203/04017; G06F 3/041; G06F 3/044
USPC ........................................................ 345/178
See application file for complete search history.

(56) References Cited

U.S. PATENT DOCUMENTS

| | | | |
|---|---|---|---|
| 6,471,415 B1 * | 10/2002 | Poorman | 385/59 |
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2008/0158183 A1 * | 7/2008 | Hotelling et al. | 345/173 |
| 2009/0207367 A1 * | 8/2009 | Oohira | 349/150 |
| 2009/0315854 A1 | 12/2009 | Matsuo | |
| 2011/0134075 A1 * | 6/2011 | Takusa | 345/174 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Kathy Wang-Hurst
*Assistant Examiner* — David Tung
(74) *Attorney, Agent, or Firm* — Baker Botts LLP (57) ABSTRACT

A position sensing panel may include electrode connecting lines from two different sets of electrodes arranged so that the distance between a side edge of a connecting line from one of the set of electrodes and a center of an adjacent connecting line from the same set of electrodes may be less than the distance between the connecting line and a nearest connecting line from the other set of electrodes.

8 Claims, 9 Drawing Sheets

POSITION SENSING PANEL

BACKGROUND

A position sensor can detect the presence and location of a touch by a finger or by an object, such as a stylus, within an area of an external interface of the position sensor. In a touch sensitive display application, the position sensor enables, in some circumstances, direct interaction with information displayed on the screen, rather than indirectly via a mouse or touchpad. Position sensors can be attached to or provided as part of devices with displays. Examples of devices with displays include, but are not limited to, computers, personal digital assistants, satellite navigation devices, mobile telephones, portable media players, portable game consoles, public information kiosks, and point of sale systems. Position sensors have also been used as control panels on various appliances.

There are a number of different types of position sensors and touch screens. Examples include, but are not limited to resistive touch screens, surface acoustic wave touch screens, capacitive touch screens, and the like. A capacitive touch screen, for example, may include an insulator coated with a transparent conductor in a particular pattern. When an object, such as a finger or a stylus, touches the surface of the screen there may be a change in capacitance. This change in capacitance may be measured by a controller to determine where the touch occurred on the touch screen.

In a mutual capacitance configuration, for example, an array of conductive drive electrodes or lines formed on one surface of an insulator and conductive sense electrodes or lines formed on an opposite surface of an insulator can be used to form a touch screen having capacitive nodes. A node may be formed where a drive electrode and a sense electrode overlap. The electrodes may be separated by an insulator to avoid electrical contact. The sense electrodes may be capacitively coupled with the drive electrodes at the nodes. A pulsed or alternating voltage applied on a drive electrode may therefore induce a charge on the sense electrodes that overlap with the drive electrode. The amount of induced charge may be susceptible to external influence, such as from the proximity of a nearby finger. When an object touches the surface of the screen, the capacitance change at each node on the grid can be measured to determine the position of the touch.

Figure 1:
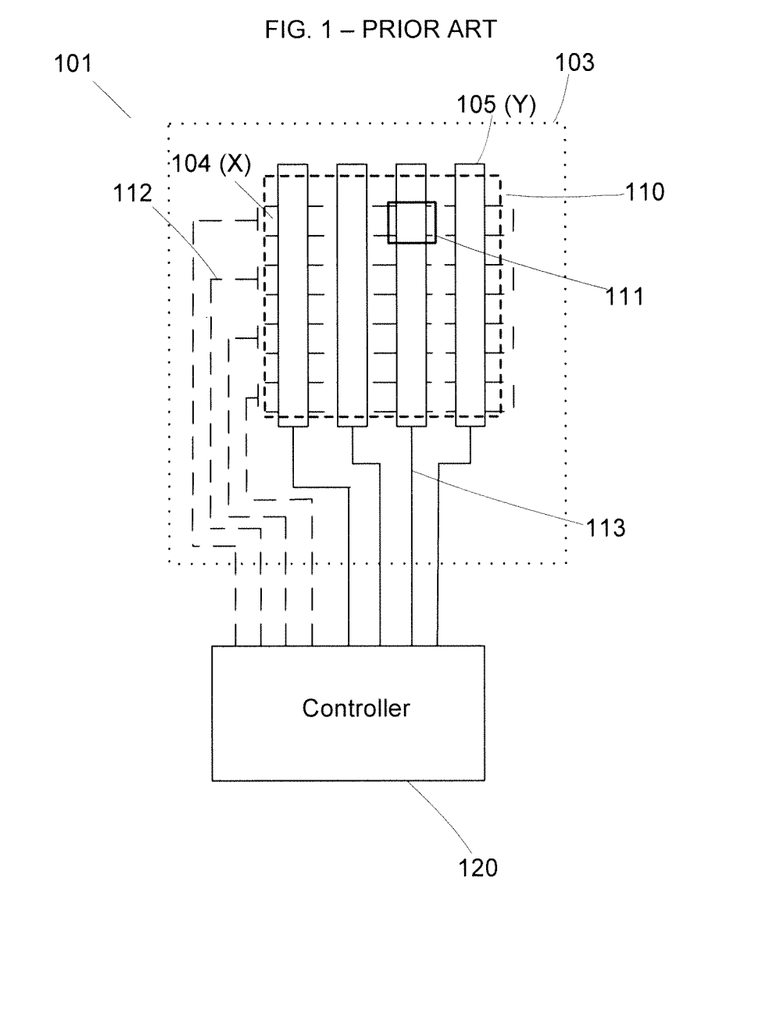
FIG. 1 illustrates schematically a plan view of an exemplary touch sensitive position sensing panel having electrode connecting lines connecting electrodes with a controller of a touch sensitive panel.

In a conventional touch screen as shown in FIG. 1, drive electrodes 104(X) and sense electrodes 105(Y) may be formed of solid portions of ITO. Sensing area 110 of the position sensing panel 101, denoted by the dotted line, encompasses a number of the nodes 111 formed where the drive electrodes 104(X) and sense electrodes 105(Y) overlap. In the example, the gaps between adjacent X electrode bars may be made narrow. This may enhance the ability of the electrodes 104(X) to shield against noise arising from an underlying display 2 such as that shown in FIG. 3. In some examples, 90% or more of the sensing area 110 may be covered by ITO. In an example such as that shown in FIG. 1, the gap between adjacent drive electrodes 104(X) may be 200 microns or less.

Figure 3:
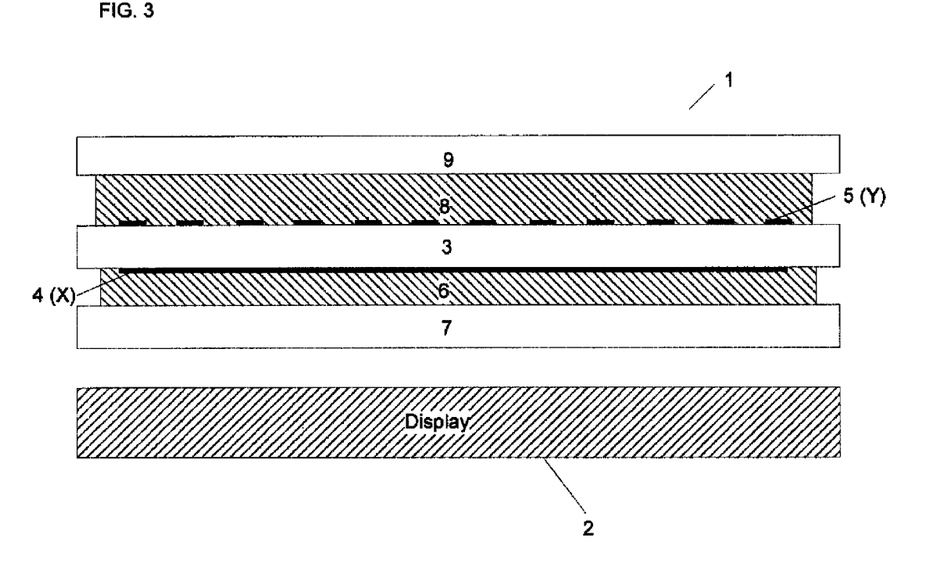
FIG. 3 illustrates schematically a cross-sectional view of a touch sensitive position sensing panel and a display for use with an exemplary arrangement of electrode connecting lines.

In the example of FIG. 1, the sensing area 110 of the position sensing panel 101 and the region of the display 2 as shown in FIG. 3 visible through the position sensing panel 101 may cover a similar area. As such, the visible region of the display 2 may be denoted by the dotted line of area 110 in FIG. 1.

In one example, each drive electrode 104(X) forms nodes with a number of the sense electrodes 105(Y) on an adjacent plane. As mentioned previously, there may be nodes 111 formed where the drive electrodes 104(X) overlap the sense electrodes 105(Y).

A number of drive electrode connecting lines 112 may be in communication with a number of drive electrodes 104(X). A number of sense electrode connecting lines 113 may be in communication with a number of sense electrodes 105(Y). The patterns of the connecting lines 112 and 113 are shown by way of an example only. In the example shown in FIG. 1, the drive electrode connecting lines 112 and the sense electrode connecting lines 113 may be connected to a control unit 120.

A change in capacitance may occur when an object touches the surface of the panel 101. In some examples, the change in capacitance at the node 111 may be sensed by the control unit 120. The control unit 120 applies pulsed or alternating voltages to the drive electrodes 104(X) through the drive electrode connecting lines 112. The control unit 120 measures the amount of charge induced on the sense electrodes 105(Y) through the sense electrode connecting lines 113. The control unit 120 determines that a touch may have occurred and calculates the location of the touch based upon the changes in capacitance sensed at one or more of the nodes 111.

In the example of FIG. 1, the drive electrode connecting lines 112 and the sense electrode connecting lines 113 may be arranged in separate non-overlapping regions of the position sensing panel 101.

Figure 2:
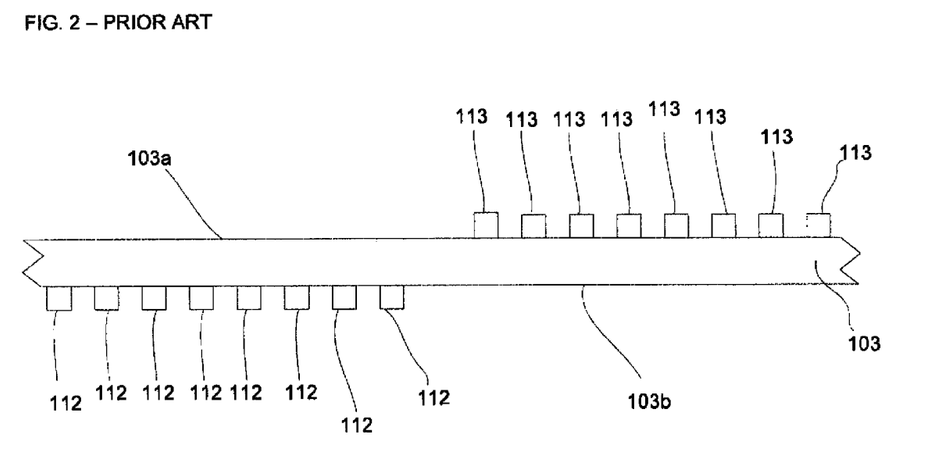
FIG. 2 illustrates schematically a cross-sectional view of the conventional arrangement of electrode connecting lines of the touch sensitive position sensing panel of FIG. 1.

FIG. 2 illustrates the arrangement of drive electrode connecting lines 112 and the sense electrode connecting lines 113 in the example of FIG. 1 in more detail. In this example, the sense electrode connecting lines 113 and the drive electrode connecting lines 112 may be provided on opposed faces 103a and 103b of the substrate 103. The sense electrode connecting lines 113 and the drive electrode connecting lines 112 may be arranged in different regions of the substrate so that the drive electrode connecting lines 112 and the sense electrode connecting lines 113 may not overlap one another and may not be in close proximity to one another.

As is explained above, in some examples, the control unit 120 applies pulsed or alternating voltages to the drive electrodes 104(X) through the drive electrode connecting lines 112, measures the amount of charge induced on the sense electrodes 105(Y) through the sense electrode connecting lines 113, and determines that a touch may have occurred and the location of the touch based upon the sensed changes in capacitance. If capacitive coupling was to occur between a drive electrode connecting line 112 and a sense electrode connecting line 113, this could result in the pulsed or alternating voltages applied to the drive electrode connecting line 112 inducing charges in the sense electrode connecting line 113, which may cause a false determination that a touch may have occurred, or a miscalculation of the location of a touch. In some examples, the sense electrode connecting lines 113 and the drive electrode connecting lines 112 may be spaced apart to prevent capacitive coupling between the sense electrode connecting lines 113 and the drive electrode connecting lines 112.

SUMMARY

A position sensing panel may include electrode connecting lines from two different sets of electrodes arranged so that the distance between a side edge of a connecting line from one of the set of electrodes and a center of an adjacent connecting line from the same set of electrodes may be less than the distance between the connecting line and a nearest connecting line from the other set of electrodes.

BRIEF DESCRIPTION OF THE FIGURES

The figures depict one or more implementations in accordance with the present disclosure, by way of example, not by way of limitation. In the figures, like reference numerals refer to the same or similar elements.

DETAILED DESCRIPTION

In the following detailed description, numerous specific details are set forth by way of examples. In order to avoid unnecessarily obscuring examples of the present disclosure, those methods, procedures, components, and/or circuitry that are well known to one of ordinary skill in the art have been described at a relatively high level.

Reference is now made in detail to the examples illustrated in the accompanying figures and discussed below.

A display may be overlaid with a touch position sensing panel to implement a touch sensitive display device. Exemplary displays include liquid crystal displays, active matrix liquid crystal displays, electroluminescent displays, electrophoretic displays, plasma displays, cathode-ray displays, OLED displays, or the like. It will be appreciated that light emitted from the display may be able to pass through the touch position sensing panel with minimal absorption or obstruction.

FIG. 3 illustrates an exemplary touch position sensing panel 1 which overlies a display 2. In the illustrated example, the panel 1 includes an insulating substrate 3 having two opposing faces. Although touch sensors may implement other types of touch sensing, for discussion purposes, the drawing shows an example of a structure that may be used to implement a mutual capacitance type touch sensitive panel.

The panel 1 includes a number of electrodes 4(X) and a number of electrodes 5(Y) provided on opposite faces 3a and 3b of the substrate 3. The electrodes 4(X), which may be on face 3b, may be arranged in one direction and the electrodes 5(Y), which may be on face 3a, may be arranged in a direction different than the direction of electrodes 4(X). Other conductive tracks may also be provided on the opposing faces 3a and 3b of the substrate 3. These other conductive tracks provide drive and sense connection lines for the electrodes 4(X) and 5(Y). The connecting lines are not shown in FIG. 3, but examples are shown in later drawings. Further conductive tracks may also be provided on one or both of the opposing faces 3a and 3b of the substrate 3 for other purposes. The substrate 3 may be provided adjacent to the display 2 such that electrodes 4(X) are arranged between the display 2 and the substrate 3. An adhesive layer 6 of an optically clear adhesive may be between the electrodes 4(X) and a transparent covering sheet 7 adjacent the display as shown by way of example. A gap may be formed between the display 2 and the transparent covering sheet 7. Another adhesive layer 8 of an optically clear adhesive may be between the electrodes 5(Y) and a transparent covering sheet 9.

The transparent covering sheet 7 and the adhesive layer 6 of optically clear adhesive may encapsulate the electrodes 4(X), and the other conductive tracks formed on face 3b of the substrate 3. The transparent covering sheet 9 and the adhesive layer 8 of optically clear adhesive may encapsulate the electrodes 5(Y), and the other conductive tracks formed on face 3a of the substrate 3. The encapsulation of the electrodes 4(X) and 5(Y), and the other conductive tracks, may provide protection from physical and environmental damage. In some examples, portions of the conductive tracks may be exposed to provide connection points for connection to external drive circuitry.

In the mutual capacitance example, electrodes 4(X) may be drive electrodes provided on face 3b of the substrate 3, and electrodes 5(Y) may be sense electrodes provided on the opposing face 3a of the substrate 3. Capacitive sensing nodes may be formed by capacitive coupling nodes in the localized regions at and around where electrodes 4(X) and 5(Y) cross over each other and are separated by the substrate 3.

One or both of the sets of electrodes 4(X) and 5(Y), may be formed from a conductive material, such as a metal. Suitable metals include copper, silver, gold, aluminum, tin and other metals used in conductive wiring. In some examples, the sense electrodes may be patterned in narrow lines to allow most of the light emitted from the display and incident on the sense electrode layer to pass through the electrode layer between the narrow metal lines. The narrow lines may be no more than 20 microns wide. An exemplary range may be 1-5 microns. Narrower lines have reduced visibility to the naked eye. By forming electrodes 4(X) or 5(Y) from narrow conductive lines, the position sensing panel may be formed such that no more than about 10% of the active area is covered by the metal lines of the electrodes. Less coverage of the active area may allow for greater transparency of the position sensing panel, reduce visibility of the electrodes to the human eye, and reduce perceptible darkening or other loss of display quality. An exemplary coverage may be less than 5%.

In some examples, the electrodes 4(X) may be formed from a clear conductive material and the electrodes 5(Y) may be formed from narrow conductive metal lines. In other examples, the electrodes 4(X) may be formed from narrow conductive metal lines and the electrodes 5(Y) may be formed from a clear conductive material. In other examples, both of the sets of electrodes 4(X) and 5(Y) may be formed from a clear conductive material.

Indium tin oxide (ITO) is an example of a clear conductive material that can be used to form either one or both sets of electrodes 4(X) and 5(Y) in the example of FIG. 3. In some examples, any other clear conductive material may be used, such as other inorganic and organic conductive materials, such as antimony tin oxide (ATO), tin oxide, poly(ethylene dioxythiophene) (PEDOT), or other conductive polymers, carbon nanotube or metal nanowire impregnated materials, and the like. Further, opaque metal conductors may be used such as a conductive mesh, which may be of copper, silver or other conductive materials.

The other conductive tracks in addition to the electrodes 4(X) and 5(Y) which may be provided on the substrate 3, such as the drive and sense connection lines, may also be formed from a clear conductive material or narrow conductive metal lines, in a manner similar to the electrode layers 4(X) and 5(Y) on the respective surfaces, for example, where at least part of the other conductive tracks lie inside a visible region of the panel over the display. In an example where the other conductive tracks, or parts of the other conductive tracks, lie outside a visible region of the display 2, the light-transmissibility of the other conductive tracks, or the parts of the other conductive tracks lying outside the visible region of the display 2, may not affect the light-transmitting properties of the panel. In some examples, the other conductive tracks, or parts of the other conductive tracks, which lie outside a visible region of the display 2 may be formed from continuous regions of a conductive material, such as a metal.

Figure 4:
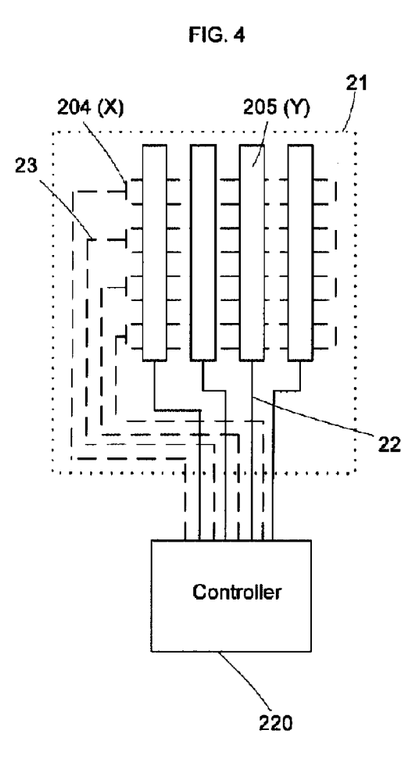
FIG. 4 illustrates a plan view of an exemplary arrangement of electrode connecting lines of a touch sensitive position sensing panel together with electrodes and a controller of a touch sensitive position sensing panel.

FIG. 4 shows a touch screen with an exemplary arrangement of connecting lines. As is shown, drive electrodes 204 (X) and sense electrodes 205(Y) may be formed of solid portions of ITO. Each of the drive electrodes 204(X) and sense electrodes 205(Y) may have electrode connecting lines connecting the electrodes to the controller 220. The drive electrode connecting lines 23 and the sense electrode connecting lines 22 may be on opposite sides of a substrate 21. In contrast to the conventional arrangement as depicted in FIG. 1, drive electrode connecting lines 23 may overlap with spaces in between the sense electrode connecting lines 22, and sense electrode connecting lines 22 may overlap with spaces in between the drive electrode connecting lines 23.

Figure 5:
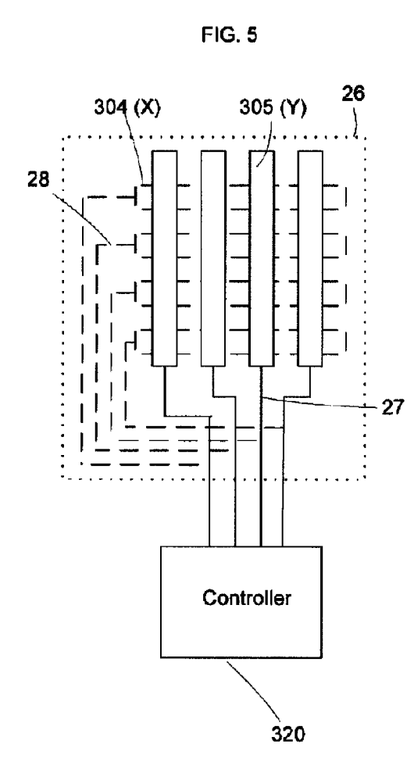
FIG. 5 illustrates a plan view of another exemplary arrangement of electrode connecting lines of a touch sensitive position sensing panel together with electrodes and a controller of a touch sensitive position sensing panel.

FIG. 5 shows another exemplary arrangement of electrode connecting lines. As is shown, drive electrodes 304(X) and sense electrodes 305(Y) may have electrode connecting lines connecting the electrodes to the controller 320. The drive electrode connecting lines 28 and the sense electrode connecting lines 27 may be on opposite sides of a substrate 26. The sense electrode connecting lines 27 may overlap the drive electrode connecting lines 28. Because of this overlap, the drive electrode connecting lines 28 are not shown in the figure in the portions where the drive electrode connecting lines 28 overlap with the sense electrode connecting lines 27.

Figure 6:
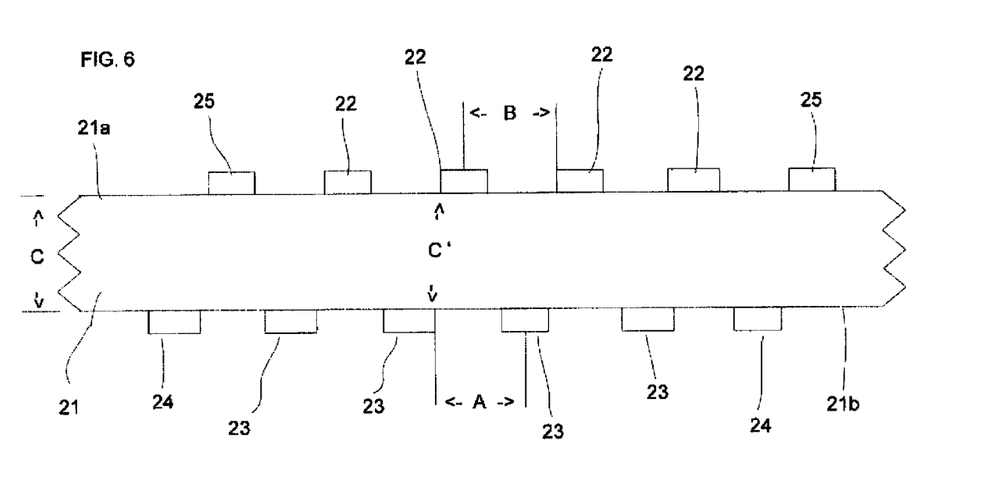
FIG. 6 illustrates schematically a cross-sectional view of the arrangement of exemplary electrode connecting lines of FIG. 4.

FIG. 6 illustrates a cross-sectional view of the exemplary arrangement of electrode connecting lines of FIG. 4. As is illustrated, the connecting line arrangement of two different electrodes overlap. A substrate 21 may have face 21a on the substrate, and face 21b opposite face 21a. The substrate 21, for example, may serve as the substrate 2 in the panel of FIG. 3. Sense electrode connecting lines 22 may be provided on face 21a. Drive electrode connecting lines 23 may be provided on face 21b.

In the example of FIG. 6, the conductive drive electrode connecting lines 23 may have substantially the same width and may be arranged as an array of parallel drive electrode connecting lines 23 on face 21b with adjacent drive electrode connecting lines 23 separated by substantially equal distances. As a result, a distance A, the distance between the edge of each drive electrode connecting line 23 and the center of an adjacent drive electrode connecting line 23 may be substantially the same for each of the drive electrode connecting lines 23.

In the example of FIG. 6, the conductive sense electrode connecting lines 22 may have substantially the same width and may be arranged as an array of parallel sense electrode connecting lines 22 on face 21a with adjacent sense electrode connecting lines 22 separated by substantially equal distances. As a result a distance B, the distance between the edge of each sense electrode connecting line 22 and the center of an adjacent sense electrode connecting line 22 may be substantially the same for each of the sense electrode connecting lines 22.

In some examples, the distance A and the distance B may be substantially the same. In other examples, the distance A and the distance B may be different.

In the example of FIG. 6, the sense electrode connecting lines 22 and the drive electrode connecting lines 23 may be arranged in substantially the same region of the substrate 21. The sense electrode connecting lines 22 and the drive electrode connecting lines 23 may be arranged parallel to one another and located at interleaved locations, with the sense electrode connecting line 22 on face 21a, and the drive electrode connecting line 23 on face 21b of the substrate 2L In this example, the sense electrode connecting lines 22 may be aligned, in a direction perpendicular to the plane of the substrate 21, with the spaces separating the drive electrode connecting lines 23. The drive electrode connecting lines 23 may be aligned, in a direction perpendicular to the plane of the substrate 21, with the spaces separating the sense electrode connecting lines 22. Accordingly, although the drive electrode connecting lines 23 and the sense electrode connecting lines 22 may be located in substantially the same region of the substrate 21, the drive electrode connecting lines 23 and the sense electrode connecting lines 22 do not overlap one another.

In the example shown in FIG. 6, the thickness C of the substrate 21 may be greater than the distance A and the distance B. As such, because the thickness C is the minimum distance between any single drive electrode connecting line 23 and any single sense electrode connecting line 22, the distance C' between a drive electrode connecting line 23 on face 21b and the nearest sense electrode connecting line 22 on face 21a, may be greater than the distance A. Similarly, the distance C' between a sense electrode connecting line 22 on face 21a and the nearest drive electrode connecting line 23 on face 21b, may be greater than the distance B. This relationship of the relative distances between the drive electrode connecting lines 23 and the sense electrode connecting lines 22 can reduce or prevent capacitive coupling between a drive electrode connecting line 23 and a sense electrode connecting line 22.

In the example of FIG. 6, the space between adjacent drive electrode connecting lines 23 may be greater than the width of the sense electrode connecting lines 22 and the space between adjacent sense electrode connecting lines 22 may be greater than the width of the drive electrode connecting lines 23. The sense electrode connecting lines 22 may be aligned with the space between the drive electrode connecting lines 23, and the drive electrode connecting lines 23 may be aligned with the space between each of the sense electrode connecting lines 22. This arrangement maximizes the separation between the drive electrode connecting lines 23 and the sense electrode connecting lines 22.

In the example of FIG. 6, two conductive ground lines 24 may be located on the face 21b, with one ground line 24 located on each side of the array of drive electrode connecting lines 23. The ground lines 24 may have substantially the same width as the drive electrode connecting lines 23 and may be separated from the adjacent drive electrode connecting lines 23 by substantially the same distance as the distance between each of the drive electrode connecting lines 23. As a result, the distance between the edge of a drive electrode connecting line 23 adjacent a ground line 24 and the center of the adjacent ground line 24 may be the distance A.

In the example of FIG. 6, two conductive ground lines 25 may be located on the face 21a, with one located on each side of the array of sense electrode connecting lines 22. The ground lines 25 may have substantially the same width as the sense electrode connecting lines 22 and may be separated from adjacent sense electrode connecting lines 22 by substantially the same distance as the distance between each of the sense electrode connecting lines 22. As a result, the distance between the edge of a sense electrode connecting line 22 adjacent a ground line 25 and the center of the adjacent ground line 25 may be the distance B.

By arranging ground lines 24 and 25 at the edge of each array of electrode connecting lines, capacitive coupling between a drive electrode connecting line 23 at the edge of the array of drive electrode connecting lines 23, and a sense electrode connecting line 22, or between a sense electrode connecting line 22 at the edge of the array of sense electrode connecting lines 22 and a drive electrode connecting line 23 can be prevented or reduced.

Figure 7:
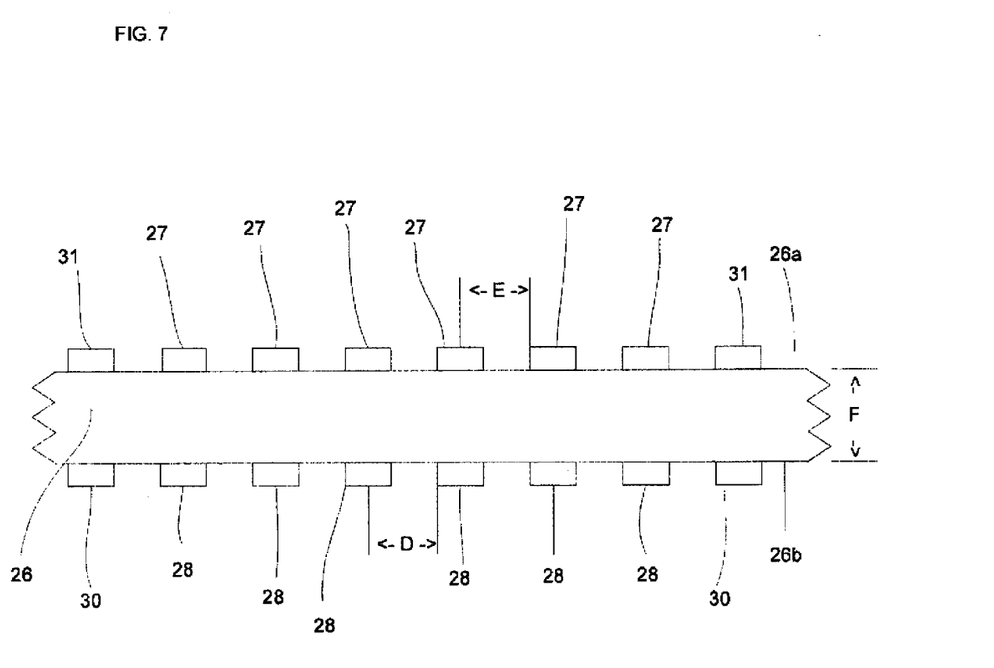
FIG. 7 illustrates schematically a cross-sectional view of the arrangement of exemplary electrode connecting lines of FIG. 5.

FIG. 7 is a cross-sectional view of the exemplary arrangement of electrode connecting lines of FIG. 5. As is illustrated, the connecting lines from two different electrodes overlap. A substrate 26 may have a face 26a on the substrate 26, and another face 26b on the substrate opposite face 26a. The substrate 26, for example, may serve as the substrate 2 in the panel of FIG. 3. Conductive sense electrode connecting lines 27 may be provided on face 26a of the substrate 26. Conductive drive electrode connecting lines 28 may be provided on face 26b of the substrate 26.

In the example of FIG. 7, the drive electrode connecting lines 28 may have substantially the same width and may be arranged as an array of parallel drive electrode connecting lines 28 on face 26b with adjacent drive electrode connecting lines 28 separated by substantially equal distances. As a result, a distance D, the distance between the edge of drive electrode connecting line 28 and the center of an adjacent drive electrode connecting line 28, may be substantially the same for each of the drive electrode connecting lines 28:

Also shown in FIG. 7, the sense electrode connecting lines 27 may have substantially the same width and may be arranged as an array of parallel sense electrode connecting lines 27 on face 26a with adjacent sense electrode connecting lines 27 separated by substantially equal distances. As a result, a distance E, the distance between the edge of a sense electrode connecting line 27 and the center of an adjacent sense electrode connecting line 27, may be substantially the same for each of the adjacent sense electrode connecting lines 27.

In some examples, the distance D and the distance E may be substantially the same. In other examples, the distance D and the distance E may be different.

In the example of FIG. 7, the sense electrode connecting lines 27 may be aligned with the drive electrode connecting lines 28.

In the example of FIG. 7, the thickness of the substrate 26, which corresponds to the distance F between the faces 26a and 26b on which the sense electrode connecting lines 27 and the drive electrode connecting lines 28 may be formed, may be greater than the distances D and E. As a result, the distance between a drive electrode connecting line 28 on face 26b and the nearest sense electrode connecting line 27 on face 26a may be greater than the distance D, and the distance between a sense electrode connecting line 27 on face 26a and the nearest drive electrode connecting line 28 on face 26b may be greater than the distance E. This relationship of the relative distances between the drive electrode connecting lines 28 and sense electrode connecting lines 27 can reduce or prevent capacitive coupling between a drive electrode connecting line 28 and a sense electrode connecting line 27.

In the example of FIG. 7, two conductive ground lines 30 may be located on the face 26b of the substrate 26, with one ground line 30 located on each side of the array of drive electrode connecting lines 28. The ground lines 30 may have substantially the same width as the drive electrode connecting lines 28 and may be separated from the adjacent drive electrode connecting lines 28 by substantially the same distance as the distance between the drive electrode connecting lines 28. As a result the distance between the edge of a drive electrode connecting line 28 adjacent a ground line 30 and the center of the adjacent ground line 30 may be the distance D.

Also shown in FIG. 7, two conductive ground lines 31 may be located on the face 26a, with one conductive ground line 31 located on each side and outside of the array of sense electrode connecting lines 27. The ground lines 31 have substantially the same width as the sense electrode connecting lines 27 and may be separated from the adjacent sense electrode connecting lines 27 by substantially the same distance as the distance between the sense electrode connecting lines 27. As a result the distance between the edge of a sense electrode connecting line 27 adjacent a ground line 31 and the center of the adjacent ground line 31 may be the distance E.

As in an earlier example of FIG. 6, by positioning the ground lines 30 and 31 at the edge of each array of electrode connecting lines as shown in FIG. 7, capacitive coupling between a drive electrode connecting line 28 at the edge of the array of drive electrode connecting lines 28 and a sense electrode connecting line 27, or between a sense electrode connecting line 27 at the edge of the array of sense electrode connecting lines 27 and a drive electrode connecting line 28, can be prevented or reduced.

In the examples illustrated in FIG. 7, the drive electrode connecting lines 28 and the sense electrode connecting lines 27 may be aligned with one another in a direction perpendicular to the plane of the substrate 21. In other examples, the drive electrode connecting lines 28 and the sense electrode connecting lines 27 could have other relative orientations. For example, the sense electrode connecting lines 27 and the drive electrode connecting lines 28 may be partially aligned with each other by a variable distance such that a portion of one electrode connecting line overlaps its counterpart, and the remaining portion overlaps the space in between adjacent counterparts.

Figure 8:
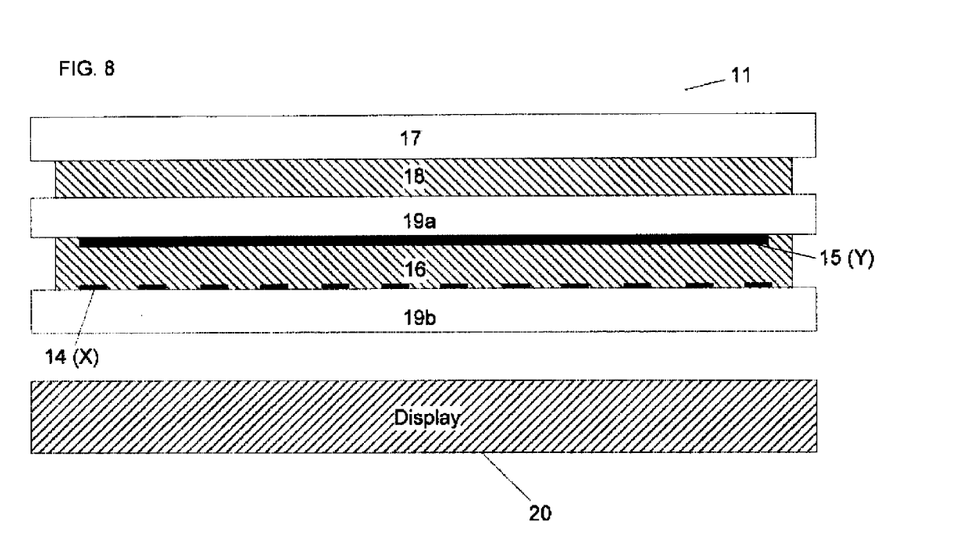
FIG. 8 illustrates schematically a cross-sectional view of another touch sensitive position sensing panel and a display for use with an exemplary arrangement of electrode connecting lines.

In other examples the drive electrode connecting lines and the sense electrode connecting lines may be formed on opposed faces of two different substrates. FIG. 8 shows an exemplary touch position sensing panel 11 which overlies a display 20. The panel 11 includes two insulating substrates 19a and 19b. A number of sense electrodes 15(Y) may be arranged on substrate 19a. A number of drive electrodes 14(X) may be arranged on substrate 19b. In some examples, the sense electrodes 15(Y) may be arranged facing the drive electrodes 14(X). In between the drive electrodes 14(X) and sense electrodes 15(Y) there may be an adhesive insulating layer 16. The panel may also include a transparent covering sheet 17. An optically transparent adhesive layer 18 may be between the transparent covering sheet 17 and the substrate 19a.

Figure 11:
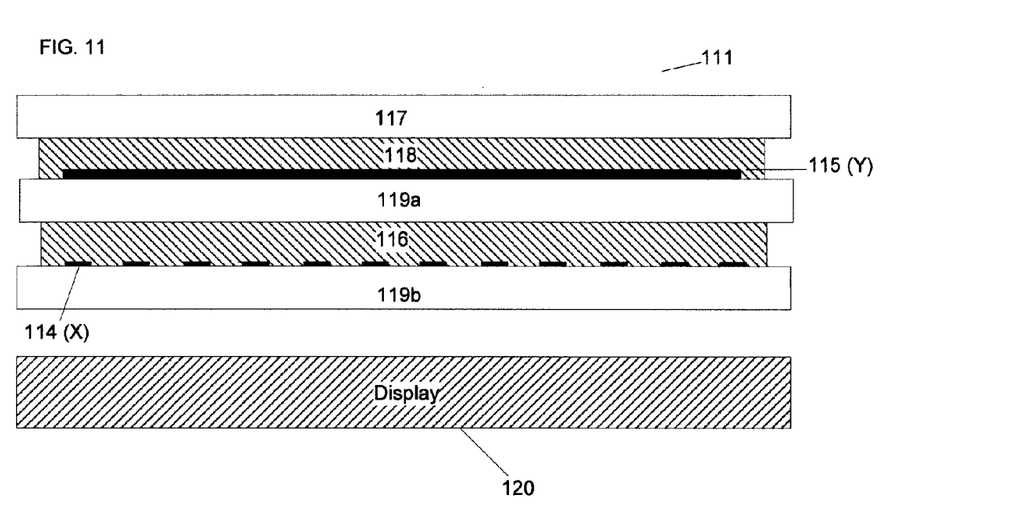
FIG. 11 illustrates schematically a cross-sectional view of another touch sensitive position sensing panel and a display for use with an exemplary arrangement of electrode connecting lines.

In other examples, the touch position sensing panel may have different arrangements of electrodes. For example, FIG. 11 shows an exemplary touch position sensing panel 111 which overlies a display 120. The panel 111 includes two insulating substrates 119a and 119b. A number of sense electrodes 115(Y) may be arranged on an upper surface of substrate 119a. A number of drive electrodes 114(X) may be arranged on an upper surface of substrate 19b. The panel may also include a transparent covering sheet 117. An optically transparent adhesive layer 118 may be between the transparent covering sheet 117 and the substrate 119a. Another optically transparent adhesive layer 116 may be between the substrate 119a and the substrate 119b.

Figure 12:
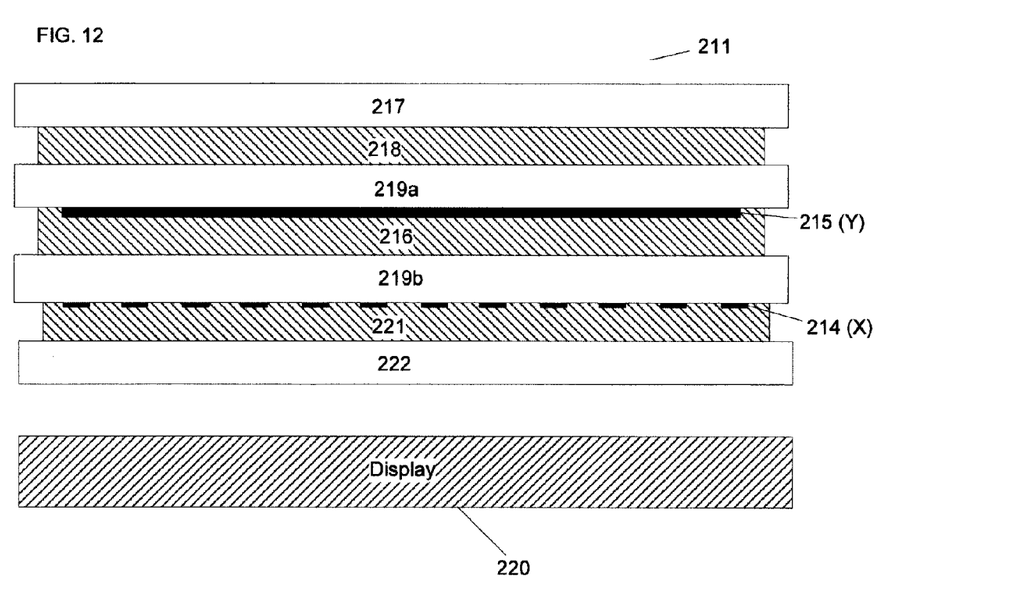
FIG. 12 illustrates schematically a cross-sectional view of another touch sensitive position sensing panel and a display for use with an exemplary arrangement of electrode connecting lines.

In another exemple shown in FIG. 12, a touch position sensing panel 211 overlies a display 220. The panel 211 includes two insulating substrates 219a and 219b. A number of sense electrodes 215(Y) may be arranged on a bottom surface of substrate 219a. A number of drive electrodes 214(X) may be arranged on a bottom surface of substrate 219b. The panel may also include a transparent covering sheet 217 at the top of the panel 211. An optically transparent adhesive layer 218 may be arranged between the transparent covering sheet 217 and the substrate 219a. Another optically transparent adhesive layer 216 may be arranged between the substrate 219a and the substrate 219b. The panel 211 may also have a bottom covering sheet 222 arranged between the substrate 219b and the display 220. Another optically transparent adhesive layer 221 may be arranged between the bottom covering sheet 222 and the substrate 219b.

Figure 9:
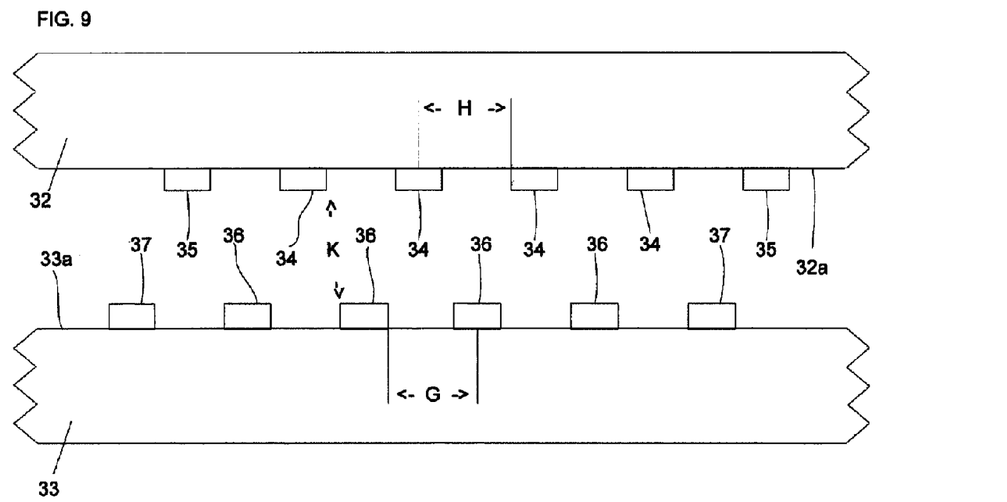
FIG. 9 illustrates schematically a cross-sectional view of an exemplary arrangement of electrode connecting lines for use with another touch sensitive position sensing panel.

FIG. 9 shows an exemplary arrangement of connecting lines for a touch position sensing panel having electrode connecting lines arranged on two substrates. The arrangement shown in FIG. 9 may have an electrode connecting line spacing similar to that shown in FIG. 6, or as shown as a plan view in FIG. 4, in that the sense electrode connecting lines 34 may be aligned with the spaces in between the drive electrode connecting lines 36 and the drive electrode connecting lines 36 may be aligned with spaces in between the sense electrode connecting lines 34.

The drive electrode connecting lines 36 have substantially the same width and may be arranged as an array of parallel drive electrode connecting lines 36 on the substrate 33 with adjacent drive electrode connecting lines 36 separated by substantially equal distances. As a result, the distance G between the edge of drive electrode connecting line 36 and the center of an adjacent drive electrode connecting line 36, may be substantially the same for each of the drive electrode connecting lines 36.

Also shown in FIG. 9, the sense electrode connecting lines 34 may each have substantially the same width and may be arranged as an array of parallel sense electrode connecting lines 34 on substrate 32 with adjacent sense electrode connecting lines 34 separated by substantially equal distances. As a result, the distance H between the edge of a sense electrode connecting line 34 and the center of an adjacent sense electrode connecting line 34, may be substantially the same for each of the adjacent sense electrode connecting lines 34.

In the example shown in FIG. 9, the distance K between the sense electrode connecting lines 34 on substrate 32 and the drive electrode connecting lines 36 on substrate 33 may be greater than the distance G and the distance H. As with the example in FIGS. 5 and 6, this relationship of the relative distances in FIG. 9 between the drive electrode connecting lines 36 and the sense electrode connecting lines 34 can reduce or prevent capacitive coupling between a drive electrode connecting line 36 and a sense electrode connecting line 34.

In the example of FIG. 9, two conductive ground lines 37 may be located on the face 33a of substrate 33, with one ground line 37 located on each side of the array of drive electrode connecting lines 36. The ground lines 37 may have substantially the same width as the drive electrode connecting lines 36 and may be separated from the adjacent drive electrode connecting lines 36 by substantially the same distance as the distance between each of the drive electrode connecting lines 36. As a result, the distance between the edge of a drive electrode connecting line 36 adjacent a ground line 37 and the center of the adjacent ground line 36 is the distance G.

In the example of FIG. 9, two conductive ground lines 35 may be located on the face 32a of substrate 32, with one conductive ground line located on each side of the array of sense electrode connecting lines 34. The ground lines 35 may have substantially the same width as the sense electrode connecting lines 34 and may be separated from adjacent sense electrode connecting lines 34 by substantially the same distance as the distance between each of the sense electrode connecting lines 34. As a result, the distance between the edge of a sense electrode connecting line 34 adjacent a ground line 35 and the center of the adjacent ground line 35 is the distance H.

Figure 10:
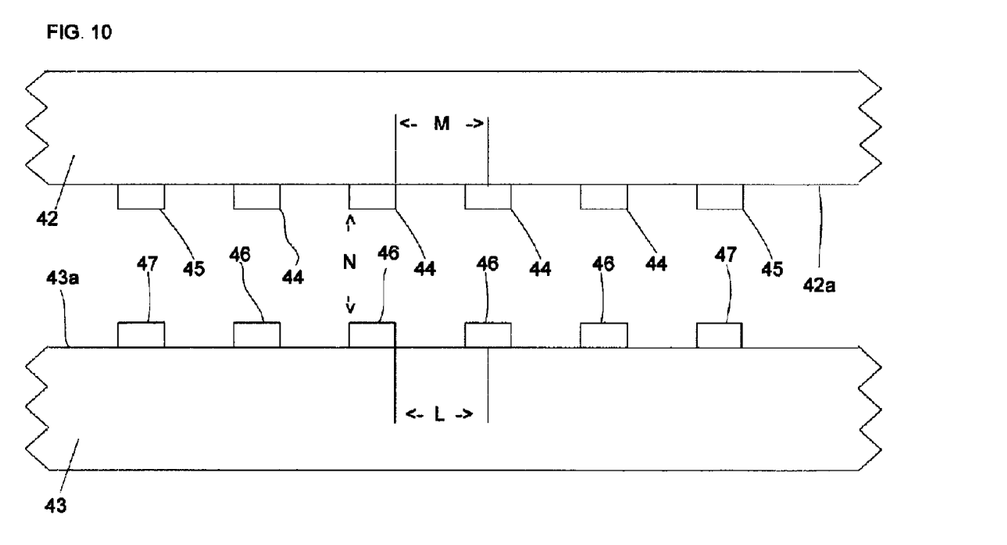
FIG. 10 illustrates schematically a cross-sectional view of another exemplary arrangement of electrode connecting lines for use with another touch sensitive position sensing panel.

In other examples, the electrode connecting lines may be aligned with each other in a direction perpendicular to the plane of the substrate. For example, FIG. 10 shows an exemplary arrangement of connecting lines for a touch position sensing panel having electrode connecting lines arranged on two substrates 42 and 43. The arrangement shown in FIG. 10 may have an electrode connecting line spacing similar to that shown in FIG. 7, or as shown as a plan view of FIG. 5, in that the sense electrode connecting lines 44 may be aligned with the drive electrode connecting lines 46.

The drive electrode connecting lines 46 have substantially the same width and may be arranged as an array of parallel drive electrode connecting lines 46 on the substrate 43 with adjacent drive electrode connecting lines 46 separated by substantially equal distances. As a result, the distance L between the edge of drive electrode connecting line 46 and the center of an adjacent drive electrode connecting line 46, may be substantially the same for each of the drive electrode connecting lines 46.

Also shown in FIG. 10, the sense electrode connecting lines 44 may have substantially the same width and may be arranged as an array of parallel sense electrode connecting lines 44 on substrate 42 with adjacent sense electrode connecting lines 44 separated by substantially equal distances. As a result, the distance M between the edge of a sense electrode connecting line 44 and the center of an adjacent sense electrode connecting line 44, may be substantially the same for each of the adjacent sense electrode connecting lines 44.

In the example shown in FIG. 10, the distance N between the sense electrode connecting lines 44 on substrate 42 and the drive electrode connecting lines 46 on substrate 43 may be greater than the distance L and the distance M.

In this example, two conductive ground lines 47 may be located on the face 43a of substrate 43, with one ground line 47 located on each side of the array of drive electrode connecting lines 46. The ground lines 47 may have substantially the same width as the drive electrode connecting lines 46 and may be separated from the adjacent drive electrode connecting lines 46 by substantially the same distance as the distance between each of the drive electrode connecting lines 46. As a result, the distance between the edge of a drive electrode connecting line 46 adjacent a ground line 47 and the center of the adjacent ground line 46 is the distance L.

In the example of FIG. 10, two conductive ground lines 45 may be located on the face 42a of substrate 42, with one conductive ground line located on each side of the array of sense electrode connecting lines 44. The ground lines 45 may have substantially the same width as the sense electrode connecting lines 44 and may be separated from adjacent sense electrode connecting lines 44 by substantially the same distance as the distance between each of the sense electrode connecting lines 44. As a result, the distance between the edge of a sense electrode connecting line 44 adjacent a ground line 45 and the center of the adjacent ground line 44 is the distance M.

In the examples illustrated in FIGS. 6, 7, 9 and 10, the drive electrode connecting lines and the sense electrode connecting lines may be parallel. In some examples, the drive electrode connecting lines and the sense electrode connecting lines may be differently arranged. For example, the drive electrode connecting lines and the sense electrode connecting lines may cross over one another. In such a case, FIGS. like 7 and 10 would show the arrangement/relationship at crossovers.

In the examples illustrated in FIGS. 6, 7, 9 and 10, the separation between adjacent drive electrode connecting lines may be constant, and the separation between sense electrode connecting lines may be of substantially equal width. In some examples, the separation between different adjacent drive electrode connecting lines and/or the separation between different adjacent sense electrode connecting lines may vary.

In the examples illustrated in FIGS. 6, 7, 9 and 10, the width of each of the drive and sense electrode connecting lines may be substantially equal. In other examples, the width of each of the drive electrode connecting lines may be substantially equal, and the width of each of the sense electrode connecting lines may be substantially equal, but the width of the drive electrodes may not be substantially equal to the width of the sense electrodes. In some examples, the width of different drive electrode connecting lines and/or the width of different sense electrode connecting lines may vary.

In some examples, the drive electrode connecting lines, the sense electrode connecting lines, and/or the ground lines, may be formed of a conductive metal. In one example, the conductive lines may be formed of copper. In another example, the conductive lines may be formed of silver. In some examples, the conductive lines may be formed of the same or similar material as the drive or sense electrodes. In other examples, the conductive lines may be formed by depositing metal onto a substrate and subsequently etching the metal. Any suitable material for use as conductive lines may be used.

In some examples, the conductive lines may be formed of conductive ink. In one example, the conductive lines may be formed of silver loaded conductive ink. In some examples the conductive lines may be formed by printing onto a substrate. Any suitable method for forming the conductive lines may be used.

In some examples, the substrate may be formed of glass. In some examples, the substrate may be formed of an insulating polymer. In other examples the substrate may be formed of the insulating polymer polyethylene terephthalate (PET). Any suitable material capable of use as a substrate may be used.

In one example, the substrate may be formed of glass having a thickness of approximately 500 μm and the conductive lines may be formed of copper or silver with a width of approximately 30 μm, with adjacent traces separated by a gap of approximately 30 μm. In some examples the conductive lines may have a width in a range from about 10 μm to about 50 μm.

In one example, the substrate may be formed of PET having a thickness of approximately 50 μm and the conductive lines may be formed of copper with a width in a range between approximately 10 μm and approximately 50 μm, with adjacent traces separated by a gap in a range between approximately 10 μm and approximately 50 μm.

In some examples some, or all, of the ground lines may be omitted.

The number of drive electrodes and the number of sense electrodes shown in the illustrated examples are by way of example only. In some examples, different numbers of drive electrodes and/or sense electrodes may be used.

In the illustrated examples, the number of drive connecting lines may be equal to the number of drive electrodes and the number of sense connecting lines may be equal to the number of sense electrodes. In other examples, the number of connecting lines may be different from the number of associated electrodes. In one example, some electrodes may be linked to two connecting lines.

In the illustrated example of FIGS. 3 and 8, the electrodes and connecting lines may be encapsulated by transparent covering sheets and adhesive layers. In some examples, some or all of the transparent covering sheets and adhesive layers may be omitted.

While the above discussion may be pertinent to mutual capacitance drive approaches, self-capacitance drive methods may be similarly improved by application of the technologies discussed in the examples above.

Various modifications may be made to the examples described in the foregoing, and any related examples may be applied in numerous applications, some of which have been described herein. It is intended by the following claims to claim any and all applications, modifications and variations that fall within the true scope of the present disclosure.

The invention claimed is:

1. A touch position sensing panel comprising:
   a substrate having a first face and a second face;
   a plurality of first electrodes arranged on the first face of the substrate;
   a plurality of first electrode connecting lines connected to the plurality of first electrodes, the plurality of first electrode connecting lines formed of a conductive material and arranged spaced apart on the first face of the substrate;
   a plurality of second electrodes arranged on the second face of the substrate;
   a plurality of second electrode connecting lines connected to the plurality of second electrodes, the plurality of second electrode connecting lines formed of a conductive material and arranged spaced apart on the second face of the substrate;

wherein:
the first face and the second face are on opposite sides of the substrate; and
the first electrode connecting lines and the second electrode connecting lines overlap, and are arranged so that:
along a length of a first electrode connecting line at least in an area where the first electrode connecting lines and the second electrode connecting lines overlap, a distance between a side edge of the first electrode connecting line and a nearest location of a center of an adjacent first electrode connecting line is less than a shortest distance between the first electrode connecting line and a nearest second electrode connecting line; and
along a length of the second electrode connecting line at least in the area where the first electrode connecting lines and the second electrode connecting lines overlap, a distance between a side edge of the second electrode connecting line and a nearest location of a center of an adjacent second electrode connecting line is less than a shortest distance between the second electrode connecting line and the first electrode connecting line.

2. The touch position sensing panel of claim 1, wherein the first electrode connecting lines are aligned with spaces in between the second electrode connecting lines in a direction perpendicular to a plane of the substrate.

3. The touch position sensing panel of claim 2, further comprising at least one ground line located on at least one side of the plurality of first electrode connecting lines.

4. The touch position sensing panel of claim 2, further comprising at least one ground line located on at least one side of the plurality of second electrode connecting lines.

5. The touch position sensing panel of claim 1, wherein the first electrode connecting lines are aligned with the second electrode connecting lines in a direction perpendicular to a plane of the substrate.

6. The touch position sensing panel of claim 5, further comprising at least one ground line located on at least one side of the plurality of first electrode connecting lines.

7. The touch position sensing panel of claim 5, further comprising at least one ground line located on at least one side of the plurality of second electrode connecting lines.

8. The touch position sensing panel of claim 1, wherein: the first electrode connecting lines are drive electrode connecting lines; and the second electrode connecting lines are sense electrode connecting lines.

* * * * *